United States Patent Office 3,257,271
Patented June 21, 1966

3,257,271
PROPHYLAXIS AGAINST DUTCH ELM DISEASE
Eugene B. Smalley, Cottage Grove, Wis., assignor to Wisconsin Alumni Research Foundation, Madison, Wis., a corporation of Wisconsin
No Drawing. Filed May 6, 1965, Ser. No. 453,810
4 Claims. (Cl. 167—30)

This application is a continuation-in-part of Serial No. 201,280, filed June 11, 1962.

The present invention relates to a prophylactic treatment against Dutch elm disease.

Dutch elm disease is known to be caused by the fungus *Ceratocystis ulmi* (Buis.) C. Moreau. It is generally fatal to elm trees (*Ulmus americana* L.) and results in the death of many thousands of trees each year in the United States. It is also known that the fungus is transmitted from diseased to healthy trees by elm bark beetles, *Scolytus multistriatus* (Marsh.) and *Hylurgopinus rufipes* (Eichh.). Attempts for the most part to control the causal organism have been directed to the control of the insect vectors with insecticides such as DDT as well as systemic insecticides. Al-Azawi, A.F. and Casida, J. E., Jour. Econ. Ent. 51, 789–790 (1958).

Investigators have studied plant growth regulators for control of plant disease. An example of this is the reduced incidence of Dutch elm disease obtained by bark applications of 2, 3, 5, 6-tetrachlorobenzoic acid. Beckman, C. H., Phytopathology 49 (4):227 (1959). Beckman's results have been confirmed in field trials, but the severe foliar malformations which developed following treatment preclude the use of this growth regulator as a practical means for controlling Dutch elm disease.

In investigations in this field searching for a practical solution to the Dutch elm disease problem, it was discovered that the well-known herbicide, 2,3,6-trichlorophenyl acetic acid, hereinafter referred to as TCPA (see U.S. Patents 2,977,212 and 3,007,789), was a potent prophylactic agent against Dutch elm disease and accomplished this end, when used in the proper amounts, in the substantial absence of foliar toxicity.

Although there is no intent to be bound by theoretical considerations, some tests suggest that control of Dutch elm disease may result from inhibition of the formation of large spring vessels (see Beckman, C. H., Phytopathology 48 (3):172–176 (1958). In the present invention, however, another mechanism appears to be involved and is believed to contribute to the high degree of prophylaxis against Dutch elm disease obtained with the use of TCPA as described herein. For example, where suppression of the disease in a tree was not obtained until the large spring vessels had become functional, histological examinations of branches from trees treated with TCPA revealed widespread tyloses-induced occlusion of the large spring vessels. This would appear to indicate that the tree was protected against the spread of the disease at least in part by blocking the spread of the infection through proliferation of xylem parenchyma and resultant tyloses-induced vessel occlusion. In other words, it appears that treatment of the tree with TCPA induces rapid internal effects which tend to localize the Dutch elm disease infection.

It has been found that the TCPA can be used in the acid form. It is, however, preferably used in water soluble salt form and is applied in aqueous solution. The preferred method for applying the TCPA to the tree consists of introducing the chemical into the vascular system of the tree by any suitable means. This can be readily accomplished by chisel cuts in the tree trunk or by boring holes in the tree or through the use of well-known injectors specifically applicable to injecting solutions into trees.

Optimum dosages of TCPA can vary extensively depending upon the size of the tree, the time of treatment, i.e. the particular time of the year during which the treatment is applied, the general condition of the tree, i.e. whether it is healthy or not for other reasons, and the extent of crown development of the tree. For the most part, it has been found that the injection of TCPA in a concentration of about 5 to 30 parts per million of the sodium salt in water solution and in amounts from about .0008 to about .00048 gram per circumference inch of the tree will generally comprise a suitable prophylactic treatment for young elm trees against Dutch elm disease. Where more concentrated solutions of TCPA are to be used, as with mature trees, it has been found that dosages in the range from about .015 to about .040 gram per circumference inch of the tree will accomplish the desired ends. Such more concentrated solutions comprise about 1.5 lbs. per gallon of TCPA (0.18 gram per milliliter). In the small amounts used, TCPA is not toxic to either the vectors of Dutch elm disease, the elm bark beetles, or to the casual organism, the fungus.

The following examples will serve to illustrate the invention.

EXAMPLE I

On May 18, 1961, the lower trunks of ten 10–15 feet tall elms, *Ulmus americana* L., were injected with 1000 cc. of an aqueous solution containing 10 parts per million of the sodium salt of TCPA. On June 15, 1961, the treated trees, as well as 10 untreated trees which were to be used as a control in the experiment, were challenged by inoculation with spores of the fungus, *Ceratycystis ulmi*, in 2 mm. x 3 mm. wounds at two points in the upper crown of each tree. Subsequent examination of the treated trees indicated that they were free from signs of Dutch elm disease while sixty per cent of the untreated trees (control trees) developed wilt and showed typical signs of the disease.

EXAMPLE II

Elm trees varying in size from 1.5 to 3.0 inches in diameter, and which were located in the Milwaukee Municipal Nursery in Milwaukee, Wisconsin, were treated with aqueous solutions of the sodium salt of 2,3,6-trichlorophenyl acetic acid (TCPA) in various concentrations as shown in the table below.

Each of the trees (except for those used as controls in the experiment) received one liter of solution through chisel cuts in the lower trunk. These injections were made on June 1, 1962. Subsequently, on June 14, 1962, all of the trees were inoculated with the fungus, *Ceratocystis ulmi* (Buis.) C. Moreau, which is known to cause Dutch elm disease, through the crown branches of the trees.

The details of the experiment and the observed results are set forth in the table below.

| Trees Treated (No.) | Chemical Concentration of Treating Solutions (p.p.m.) | Trees Injured By Chemical (percent) | Trees Evidencing Wilt in 1962 (percent) | Average Amount of Crown Damage in 1962 (percent) | Trees Dead or Wilting in 1963 (percent) | Average Amount of Crown Damage in 1963 (percent) | Trees Healthy in August 1963 (percent) |
|---|---|---|---|---|---|---|---|
| 10 | 0 | 0 | 100 | 56 | 70 | 70 | 30 |
| 10 | 5 | 0 | 80 | 21 | 30 | 39 | 70 |
| 10 | 10 | 0 | 70 | 18 | 20 | 23 | 80 |
| 10 | 20 | 0 | 30 | 2 | 0 | 0 | 100 |
| 10 | 40 | 50 | 40 | ¹54 | 50 | 59 | 50 |

¹ The estimate of crown damage included both chemical toxicity and disease.

It is evident from the above data (a comparison of the amount of damage observed in trees where no TCPA-containing solution was injected with observed damage where TCPA-containing solution was injected) that the TCPA treatment affords substantial protection against the contraction of Dutch elm disease. It is also apparent that the concentration of TCPA must be controlled to avoid damage to the tree (foliar malformation) by the chemical itself.

EXAMPLE III

In a greenhouse trial, 50 cm. tall elms were injected with 30 milliliters of TCPA per tree. Sixteen trees were used as replicates for each concentration indicated in the following table. Eight days after the treatment the trees were challenged by inoculation with a spore suspension of *Ceratocystis ulmi*. After thirty days the trees were harvested and examined for Dutch elm disease. The effectiveness of the prophylactic treatment with TCPA is shown in the table below.

| Concentration | Toxicity | Length of Vascular Discoloration | Plants with Symptoms |
|---|---|---|---|
| 0 | 0 | 40.2 | 100 |
| 5 | 0 | 31.0 | 50 |
| 10 | 0 | 30.2 | 10 |

EXAMPLE IV

In a greenhouse trial 80 to 100 cm. tall elm trees were injected with 50 milliliters of an aqueous solution containing ten parts per million of TCPA. These trees were then inoculated with a spore suspension of the fungus *Ceratocystis ulmi* at various times after treatment as shown in the table below. The trees were harvested thirty days after the inoculation and in each case examined for signs of Dutch elm disease. The observations are set out in the following table.

| Inoculation (Days After Treatment) | Control (Water Injections) | | 10 p.p.m. TCPA | |
|---|---|---|---|---|
| | Trees Wilting | Trees Healthy | Trees Wilting | Trees Healthy |
| 3 | 50 | 50 | 10 | 90 |
| 6 | 30 | 70 | 0 | 100 |
| 12 | 60 | 40 | 0 | 100 |
| 20 | 60 | 40 | 10 | 90 |
| 30 | 20 | 80 | 10 | 90 |

EXAMPLE V

Twelve to fifteen foot tall elm trees were injected with one liter each of aqueous solutions of TCPA on June 1, 1962. The solutions were introduced into the vascular system of the trees through chisel cuts in the lower trunk. Ten trees were treated for each concentration indicated in the table below (ten replicate samples). On June 14, 1962, the trees were challenged by inoculating them with a spore suspension of *Ceratocystis ulmi*.

A second group of trees, with ten replicate samples of each concentration indicated, were treated on June 12, 1962 by injection of aqeous solutions of TCPA through chisel cuts in the trunk. This group of trees was inoculated with a spore suspension of *Ceratocystis ulmi* on June 18, 1962. A subsequent examination of the trees was made for evidence of Dutch elm disease. The conditions and results obtained in each of the above two series of tests is produced in the following table.

| Chemical Concentration (p.p.m.) | Trees Injured (percent) | Trees Wilting in 1962 (percent) | Trees Wilting or Dead in 1963 (percent) | Trees Healthy in 1963 (percent) |
|---|---|---|---|---|
| Series 1: | | | | |
| 0 | 0 | 100 | 70 | 30 |
| 5 | 0 | 80 | 30 | 70 |
| 10 | 0 | 70 | 20 | 80 |
| 20 | 0 | 30 | 0 | 100 |
| 40 | 50 | 40 | 50 | 50 |
| Series 2: | | | | |
| 0 | 0 | 90 | 40 | 60 |
| 5 | 0 | 86.5 | 25 | 86.5 |
| 10 | 0 | 90 | 20 | 80 |
| 20 | 0 | 70 | 10 | 90 |
| 40 | 10 | 100 | 12 | 76 |

A comparison of the two series above indicates that the time of year at which the treatment takes place is important. The trees are more susceptible in early spring during the usually normal heavy growth season and are less susceptible to Dutch elm disease as the growth period progresses. Consequently, the TCPA treatment is more effective generally when given early in the year, usually before about the second week in June.

It is evident from the foregoing examples that TCPA, or its water soluble salts, when applied to elm trees in the manner indicated is an excellent prophylactic treatment against subsequent Dutch elm disease infections.

It has also been found that the elm trees will transport in their vascular systems TCPA applied in aqeous solution to the ground under the tree. This method of application of TCPA can also be effectively used under certain conditions for the prophylactic treatment of the trees against Dutch elm disease. As may be expected a soil drench application of this type requires far larger quantities of the prophylactic agent, TCPA, and in greater concentrations than heretofore expressed for direct trunk injection methods.

It is to be understood that the terms TCPA as used herein is intended to mean 2,3,6-trichlorophenyl acetic acid and is intended to include equivalent forms such as the water soluble salts including the acetate salts (see Tischler Patent No. 2,977,212). In addition, the term is also intended to include the commercial TCPA preparations which consist largely of the 2,3,6-trichloro isomer but also contain other isomers of trichlorophenyl acetic acid one of which has been reported as the 2,3,5-trichloro isomer (see Tischler patent supra).

It is claimed:
1. A prophylactic treatment for Dutch elm disease which consists of injecting into the vascular system of elm trees a chemical selected from the group consisting of 2,3,6-trichlorophenylacetic acid and water-soluble salts thereof in an amount up to about 0.040 grams per circumference inch of tree and sufficient to achieve the said prophylactic effect but insufficient to cause foliar malformation in the tree and which is nontoxic to the elm bark beetles, vectors of the disease, and the fungus which causes the disease.

2. The method of claim 1 wherein the chemical is the sodium salt of 2,3,6-trichlorophenylacetic acid.

3. The method of claim 2 wherein the chemical is injected into the vascular system of the tree in a concentration of from about 5 to about 30 parts per million in aqueous solution.

4. The method of claim 3 wherein the chemical is used in amounts from about .0008 to about .0048 gram per circumference inch of the tree.

References Cited by the Examiner
UNITED STATES PATENTS
3,137,563 6/1964 Newcomer et al. ____ 47—58 XR References Cited by the Applicant
Beeckman, C. H.: Phytopathology 49 (4): 227 (1959).

ABRAHAM G. STONE, *Primary Examiner.*
R. E. BAGWELL, *Assistant Examiner.*